United States Patent
Heim (10) Patent No.: US 9,665,204 B2
(45) Date of Patent: May 30, 2017

(54) CONTINUOUS CIRCLE GESTURE DETECTION FOR A SENSOR SYSTEM

(71) Applicant: Microchip Technology Incorporated, Chandler, AZ (US)

(72) Inventor: Axel Heim, Munich (DE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 67 days.

(21) Appl. No.: 14/503,883

(22) Filed: Oct. 1, 2014

(65) Prior Publication Data
US 2015/0097809 A1    Apr. 9, 2015

Related U.S. Application Data

(60) Provisional application No. 61/886,904, filed on Oct. 4, 2013.

(51) Int. Cl.
| | | |
|---|---|---|
| *G06F 3/045* | (2006.01) | |
| *G06F 3/041* | (2006.01) | |
| *G06F 3/042* | (2006.01) | |
| *G06F 3/044* | (2006.01) | |
| *G06F 3/0488* | (2013.01) | |

(52) U.S. Cl.
CPC ............ *G06F 3/0416* (2013.01); *G06F 3/042* (2013.01); *G06F 3/044* (2013.01); *G06F 3/04883* (2013.01)

(58) Field of Classification Search
CPC .... G06F 3/0416; G06F 3/04883; G06F 3/044; G06F 3/042; G06F 3/017; G06F 3/0488; G06K 9/00335
See application file for complete search history.

(56) References Cited

U.S. PATENT DOCUMENTS

| | | | |
|---|---|---|---|
| 5,903,229 A | 5/1999 | Kishi | ............... 341/20 |
| 2009/0128374 A1* | 5/2009 | Reynolds | .............. G06F 3/0202 341/33 |
| 2009/0265658 A1 | 10/2009 | Klishko et al. | ............... 715/786 |
| 2010/0149115 A1 | 6/2010 | Park et al. | .................... 345/173 |
| 2011/0205175 A1 | 8/2011 | Chen | ............................ 345/173 |

(Continued)

FOREIGN PATENT DOCUMENTS

| | | | | |
|---|---|---|---|---|
| DE | 102010007455 A1 | 8/2011 | ............... | G06F 3/00 |
| EP | 2430512 B1 | 10/2014 | ............. | G06F 3/044 |

(Continued)

OTHER PUBLICATIONS

Microchip Technology Incorporated, "MGC3130: Single-Zone 3D Tracking and Gesture Controller Data Sheet," DS40001667C, 46 pages, Nov. 19, 2013.

(Continued)

*Primary Examiner* — Andrew Sasinowski
*Assistant Examiner* — Gerald Oliver
(74) *Attorney, Agent, or Firm* — Slayden Grubert Beard PLLC (57) ABSTRACT

A method for detecting a continuous circle gesture, has the following steps: receiving vectors representative of an object movement by a object detection unit; determining from the received sequence velocity vectors a sequence of velocity vectors or an approximation thereof; estimating an angle between subsequent velocity vectors; and determining a rotation direction.

38 Claims, 4 Drawing Sheets

(56) References Cited

U.S. PATENT DOCUMENTS

| | | | |
|---|---|---|---|
| 2012/0092284 A1* | 4/2012 | Rofougaran | G06F 3/017 |
| | | | 345/173 |
| 2012/0313882 A1 | 12/2012 | Aubauer et al. | 345/174 |
| 2013/0002600 A1 | 1/2013 | Mccracken | 345/174 |
| 2013/0147833 A1 | 6/2013 | Aubauer et al. | 345/619 |
| 2014/0050354 A1 | 2/2014 | Heim et al. | 382/103 |

FOREIGN PATENT DOCUMENTS

| | | | |
|---|---|---|---|
| WO | 2005/121938 A2 | 12/2005 | G06F 3/041 |
| WO | 2007/069929 A1 | 6/2007 | A61B 5/11 |

OTHER PUBLICATIONS

International Search Report and Written Opinion, Application No. PCT/US2014/058800, 17 pages, Mar. 31, 2015.

\* cited by examiner

CONTINUOUS CIRCLE GESTURE DETECTION FOR A SENSOR SYSTEM

CROSS-REFERENCE TO RELATED APPLICATIONS

This application claims the benefit of U.S. Provisional Application No. 61/886,904 filed on Oct. 4, 2013, which is incorporated herein in its entirety.

TECHNICAL FIELD

The present disclosure relates to a method and device for a human interface, in particular a continuous circle gesture detection method for a sensor system.

BACKGROUND

Known systems for multi-level control, e.g. volume control or screen/light brightness control in consumer electronics products, use circular touch-pads or capacitive linear sliders (frequently mounted above the keyboard in notebooks), or they are using the touch information from a generic notebook touchpad when the finger is moving in a dedicated slider area, for example on the right border of the touchpad.

These sensors provide absolute position information about the finger tip, and hence the finger tip's angle on the circular touchpad or the position on the slider information that can be mapped directly or differentially to a control level in a straight forward way.

In particular for a circular touch-pad it is important that the fingertip position and the touchpad's geometric center build an angle with a reference position, e.g. on the pad's rim, and this angle can be evaluated.

When it comes to the recognition of circle gestures without fix reference position, determining an angle in the circle movement is no longer straight forward. This is the case, for example, for a generic non-circular touchpad, with 2D/3D free-air gestures using near-field capacitive sensor systems, or with mid/far field sensor systems like video or infrared camera systems.

It has to be considered that a circle movement can be either clockwise or counter-clockwise, and it will not be limited to have a fix start or stop position. At each time during the circle movement, for real-time application one can only evaluate data acquired up to the presence, i.e. only partial gesture patterns. Without knowing the drawn circle's center, in the beginning of the movement the detection unit cannot tell the direction of the circle: For example, a left-to-right movement appears in the top of a clockwise circle but also in the bottom of a counter-clockwise circle.

SUMMARY

According to an embodiment, a method for detecting a continuous circle gesture may comprise the steps of: receiving a sequence of vectors representative of an object movement by a object detection unit; determining from the received sequence of vectors a sequence of velocity vectors or an approximation thereof; estimating an angle between subsequent velocity vectors; and determining a rotation direction.

According to a further embodiment, the received sequence of vectors can be $(x_n, y_n)$ position vectors of an object movement. According to a further embodiment, velocity vectors can be computed as the difference of subsequent position vectors. According to a further embodiment, the received sequence of vectors may comprise measurement values $m_k^{(i)}$ of electrodes i at times k. According to a further embodiment, four measurement electrodes can be provided and the velocity vectors $v_k$ are determined by $$v_k \approx \begin{bmatrix} (m_k^{(4)} - m_{k-1}^{(4)}) - (m_k^{(2)} - m_{k-1}^{(2)}) \\ (m_k^{(3)} - m_{k-1}^{(3)}) - (m_k^{(1)} - m_{k-1}^{(1)}) \end{bmatrix}.$$

According to a further embodiment, the angle between two subsequent velocity vectors $$v_{new} = \begin{bmatrix} v_{new,x} \\ v_{new,y} \end{bmatrix}$$

and $$v_{old} = \begin{bmatrix} v_{old,x} \\ v_{old,y} \end{bmatrix}$$

can be determined by $\phi = \arccos(\overline{v}_{new}^T \cdot \overline{v}_{old}) \cdot S$, where $S \in \{\pm 1\}$ is the rotating direction, T indicates the vector transpose, the bar indicates normalization of a vector, i.e.

$$\overline{v} = \begin{bmatrix} \overline{v}_x \\ \overline{v}_y \end{bmatrix} := \frac{v}{\|v\|} = \begin{bmatrix} v_x \\ v_y \end{bmatrix} \cdot \frac{1}{\sqrt{v_x^2 + v_y^2}},$$

and $\|.\|$ denotes the vector length. According to a further embodiment, $S := \text{sig } n(\overline{v}_{new,x}\overline{v}_{old,y} - \overline{v}_{new,y}\overline{v}_{old,x})$. According to a further embodiment, the angle between two subsequent velocity vectors $v_{new}$ and $v_{old}$ can be approximately determined by $\phi \approx \|\overline{v}_{new} - \overline{v}_{old}\| \cdot S$, where $S \in \{\pm 1\}$ is the rotating direction. According to a further embodiment, the angle $\phi$ between two subsequent velocity vectors $v_{new}$ and $v_{old}$ can be approximately determined by $\phi \approx \sin \phi = \overline{v}_{new,x}\overline{v}_{old,y} - \overline{v}_{new,y}\overline{v}_{old,x}$. According to a further embodiment, velocity vectors are consecutive such that $v_{new} = v_k$ and $v_{old} = v_{k-1}$. According to a further embodiment, each velocity vector $v_{new}$ and $v_{old}$ in a sequence of two vectors can be normalized by the same value $\|v_{new}\|$ or $\|v_{old}\|$. According to a further embodiment, a circle counter can be realized by integrating the angles between pairs of subsequent velocity vectors. According to a further embodiment, the circle counter can be updated only if $\|v_k\|$ exceeds a predetermined threshold. According to a further embodiment, the position vectors and/or the velocity vectors and/or the circle counters can be low-pass filtered. According to a further embodiment, the sensor system can be a 2-dimensional touch positioning system, a near-field sensor systems, or a mid/far field sensor systems. According to a further embodiment, the near-field sensor system can be a capacitive non-touching sensor system based on a quasi-static electric field measurements. According to a further embodiment, the near-field capacitive sensor system may comprise one or more transmission electrodes excited with a rectangular pulse train signal and a plurality of receiving electrodes capacitively coupled with the one or more transmission electrodes.

According to another embodiment, a human device interface may comprise an interface generating a sequence of vectors representative of an object movement tracked by a gesture detection system; a processing unit configured to determine from the received vectors a sequence of velocity vectors or an approximation thereof, to estimate an angle between subsequent velocity vectors; and to determine a rotation direction; wherein the processing unit further implements a circle counter and updates values of the circle counter by adding the estimated angle with its sign depending on the rotating direction.

According to a further embodiment of the human device interface, the sequence of vectors can be $(x_n, y_n)$ position vectors of an object movement. According to a further embodiment of the human device interface, velocity vectors can be computed as the difference of subsequent position vectors. According to a further embodiment of the human device interface, the received sequence of vectors may comprise measurement values $m_k^{(i)}$ of electrodes i at times k. According to a further embodiment of the human device interface, four measurement electrodes can be provided and the velocity vectors $v_k$ are determined by $$v_k \approx \begin{bmatrix} (m_k^{(4)} - m_{k-1}^{(4)}) - (m_k^{(2)} - m_{k-1}^{(2)}) \\ (m_k^{(3)} - m_{k-1}^{(3)}) - (m_k^{(1)} - m_{k-1}^{(1)}) \end{bmatrix}.$$

According to a further embodiment of the human device interface, the angle between two subsequent velocity vectors $$v_{new} = \begin{bmatrix} v_{new,x} \\ v_{new,y} \end{bmatrix} \text{ and } v_{old} = \begin{bmatrix} v_{old,x} \\ v_{old,y} \end{bmatrix}$$

can be determined by $\phi = \arccos(\bar{v}_{new}^T \cdot \bar{v}_{old}) \cdot S$, where $S \in \{\pm 1\}$ is the rotating direction, T indicates the vector transpose, and the bar indicates normalization of a vector. According to a further embodiment of the human device interface the angle $\phi$ between two subsequent velocity vectors $v_{new}$ and $v_{old}$ can be approximately determined by $\phi \approx \|\bar{v}_{new} - \bar{v}_{old}\| \cdot S$, where $S \in \{\pm 1\}$ is the rotating direction. According to a further embodiment of the human device interface, $S := \text{sig n}(\bar{v}_{new,x} \bar{v}_{old,y} - \bar{v}_{new,y} \bar{v}_{old,x})$. According to a further embodiment of the human device interface, the angle between two subsequent velocity vectors $v_{new}$ and $v_{old}$ can be approximately determined by $\approx \sin \phi = \bar{v}_{new,x} \bar{v}_{old,y} - \bar{v}_{new,y} \bar{v}_{old,x}$. According to a further embodiment of the human device interface, velocity vectors are consecutive such that $v_{new} = v_k$ and $v_{old} = v_{k-1}$. According to a further embodiment of the human device interface, each velocity vectors $v_{new}$ and $v_{old}$ in a sequence of two vectors can be normalized by the same value $\|v_{new}\|$ or $\|v_{old}\|$. According to a further embodiment of the human device interface, a circle counter can be realized by integrating the angles between pairs of subsequent velocity vectors. According to a further embodiment of the human device interface, the circle counter can be updated only if $\|v_k\|$ exceeds a predetermined threshold. According to a further embodiment of the human device interface, the human device interface may further comprise a first low-pass filter configured to filter the position vectors and/or a second low-pass filter configured to filter the velocity vectors and/or a third low-pass filter configured to filter the circle counter. According to a further embodiment of the human device interface, the interface may comprise 2-dimensional touch positioning system, a near-field sensor systems, or a mid/far field sensor systems. According to a further embodiment of the human device interface, the near-field sensor system can be a capacitive non-touching sensor system based on a quasi-static electric field measurements. According to a further embodiment of the human device interface, the near-field capacitive sensor system may comprise one or more transmission electrodes excited with a rectangular pulse train signal and a plurality of receiving electrodes capacitively coupled with the one or more transmission electrodes.

According to yet another embodiment, an electronic device may comprise a human device interface as described above, wherein the circle counter is used for volume control, a dimmer, speed control, air condition temperature, or mechanical movement functions.

According to a further embodiment of the electronic device, the circle counter drives an LED bar.

DETAILED DESCRIPTION

According to various embodiments, a circle gesture (or pattern) which is observed is to be identified. Hence, according to some embodiments, from two subsequent velocity vectors the rotating direction and the angle between these vectors are determined in order to update the circle counter. In the following, this gesture will also be referred to as AirWheel gesture. The term "subsequent" is used throughout the specification and hereby defined to designate elements or events that are spaced apart in time. They do not have to be consecutive with no other element or event in between. Hence, the term "consecutive" is used throughout the specification and hereby defined to designate elements or events that are adjacent with respect to time.

Figure 3:
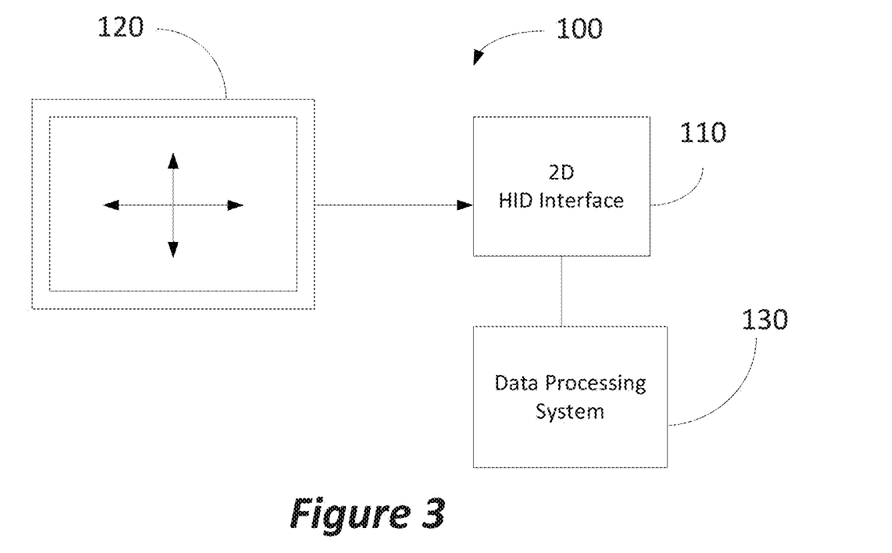
FIG. 3 shows a 2D detection system such as a track pad or touch screen.

For the general approach in this part it will be assumed that a sequence of $(x_n, y_n)$ position vectors corresponding to or being estimates of a target point is provided, e.g. a fingertip, performing a circular gesture in a two dimensional (2D) plane at subsequent discrete time instances n. The time instances do not need to be consecutive but should be subsequent in time so that one vector is newer than the other. For example, subsequent vectors $v_{new}$ and $v_{old}$ can be used, the bold letters indicating that a variable is a vector. FIG. 3 shows an exemplary two dimensional system 100 comprising, for example, a track pad touch screen 120 coupled with a 2D interface 110 connected with a processing system 130. The difference between two position vectors is a velocity vector, e.g. for two subsequent position vectors we obtain $$v_{new} := p_{new} - p_{old} = \begin{bmatrix} x_{new} - x_{old} \\ y_{new} - y_{old} \end{bmatrix}$$

which contains direction and magnitude of the movement between time 'old' and time 'new'. In the following consecutive vectors will be assumed such that old=k−1 and new=k. However, as mentioned above this may not be a requirement. It does not necessarily have to be the latest velocity vector and the one directly before it. Primarily it is important that one contains more recent data than the other. Further, these velocity vectors may already have experienced some kind of pre-processing, like low-pass filtering.

Figure 1:
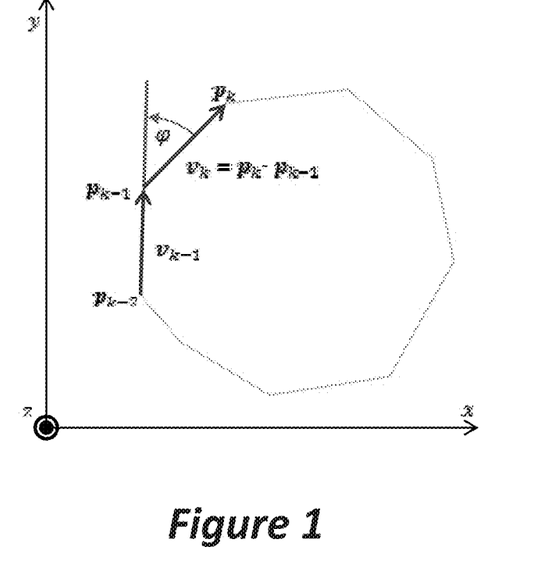
FIG. 1 shows position vectors and velocity vectors of a 2D circle gesture sampled at discrete time instances n=k, k−1, k−2, . . . .

Considering two such velocity vectors, e.g. $v_k$ and $v_{k-1}$, as shown in FIG. 1, an angle φ can be defined between them. If the rotating direction is turning right (as with a clockwise circle gesture) then φ>0. If the rotating direction is turning left (as with a counter-clockwise circle gesture) then φ<0. The circle counter can be realized by integrating the angles φ between pairs of consecutive velocity vectors.

The question is how to obtain the angle φ or a similar measure, where the interesting value range of φ is to be assumed as:

$$\varphi \in \left(-\frac{\pi}{2}, \frac{\pi}{2}\right).$$

Figure 2:
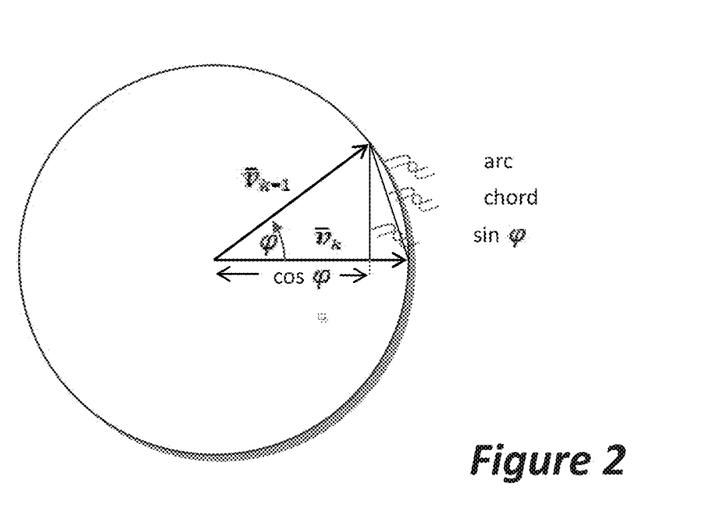
FIG. 2 shows a unit circle with normalized velocity vectors starting in the coordinate system's origin.

For this, $v_k$ and $v_{k-1}$ are normalized to unit vectors $$\bar{v}_k := \frac{v_k}{\|v_k\|}$$

as shown in FIG. 2, where $\|.\|$ denotes the length of a vector. With $\cos\varphi = \bar{v}_{k-1}^T \bar{v}_k$, the exact solution is given by $\varphi = \arccos \|\bar{v}_{k-1}^T \bar{v}_k\| \cdot S$, where $S \in \{\pm 1\}$ is the rotating direction and will be determined below, and T indicates the vector transpose.

However, the computationally complex arcus cosine function can be avoided by approximating the angle φ (which is of same value as its arc on a unit circle) by the length of $\bar{v}_k - \bar{v}_{k-1}$ (chord), i.e. $\varphi \approx \|\bar{v}_k - \bar{v}_{k-1}\| \cdot S$, where $S \in \{\pm 1\}$ is the rotating direction and will be determined below, or by its sine, i.e. $\varphi \approx \sin \varphi$. For 3-dimensional vectors a and b with x, y and z components $a_x, a_y, a_z$ and $b_x, b_y, b_z$, respectively, it holds $$|\sin\varphi| = \frac{\|a \times b\|}{\|a\|\|b\|},$$

where × denotes the cross product (vector product) which is defined as $$a \times b := \begin{pmatrix} a_x \\ a_y \\ a_z \end{pmatrix} \times \begin{pmatrix} b_x \\ b_y \\ b_z \end{pmatrix} = \begin{pmatrix} a_y b_z - a_z b_y \\ a_z b_x - a_x b_z \\ a_x b_y - a_y b_x \end{pmatrix}.$$

For 2D vectors, the vector product
is not defined as such. However, if the 2D (x/y) plane is extended by a third dimension, the z-dimension, and an arbitrary constant z value, preferably z=0, is assigned to the velocity vectors, then the vector product can be applied to the resulting 3D velocity vectors, whose z component is the value of interest. With $\bar{v}_{k-1,z} = \bar{v}_{k,z} = 0$ we obtain $$\bar{v}_k \times \bar{v}_{k-1} = \begin{pmatrix} 0 \\ 0 \\ \bar{v}_{k,x}\bar{v}_{k-1,y} - \bar{v}_{k,y}\bar{v}_{k-1,x} \end{pmatrix}$$ and hence $$\varphi \approx \sin\varphi = \|\bar{v}_k \times \bar{v}_{k-1}\| \cdot S = |\bar{v}_{k,x}\bar{v}_{k-1,y} - \bar{v}_{k,y}\bar{v}_{k-1,x}| \cdot S,$$

where |.| denotes a scalar's absolute value.

The sign of the vector product's z-component is the rotating direction and hence $$S := \operatorname{sig} n(\bar{v}_{k,x}\bar{v}_{k-1,y} - \bar{v}_{k,y}\bar{v}_{k-1,x})$$

and finally $$\varphi \approx \sin \varphi = \bar{v}_{k,x}\bar{v}_{k-1,y} - \bar{v}_{k,y}\bar{v}_{k-1,x}.$$

In the following, further possible improvements will be discussed which can be implemented in various embodiments. Hence, the various possible improvements can be used separately or combined.

Normalization

In practice, for complexity reduction by avoiding computation of square roots, both vectors $v_k$ and $v_{k-1}$ may be normalized by the same value $\|v_k\|$ or $\|v_{k-1}\|$, typically without realizable effect (provided the sample frequency is sufficiently high), i.e.

$$\|\bar{v}_k \times \bar{v}_{k-1}\| \approx \frac{\|v_k \times v_{k-1}\|}{\|v_p\|^2} = \frac{|v_{k,x}v_{k-1,y} - v_{k,y}v_{k-1,x}|}{\|v_p\|^2}, \text{ where } p \in \{k, k-1\}.$$

Jitter Suppression

For jitter suppression, the circle counter may, for example, be updated only when a minimum amount of movement is detected, e.g. when $\|v_k\|$ exceeds a threshold. This yields a differential update of the circle counter with slip.

Smoothness

The smoothness of the circle counter can be improved by applying low-pass filtering to the position vectors and/or the velocity vectors and/or the output counter.

Input Data

Depending on the underlying sensor system, the x/y position estimate may be subject to numerous processing stages, and it may depend on numerous configuration parameters, each processing stage adding risk of errors and computational complexity. However, all the proposed algorithm actually requires as input data is a two dimensional vector, where (at least approximately) the value in its first dimension increases/decreases when the target point moves in a first geometric dimension, and the $2^{nd}$ dimension increases/decreases when the target point moves in a $2^{nd}$ geometric dimension.

Figure 4:
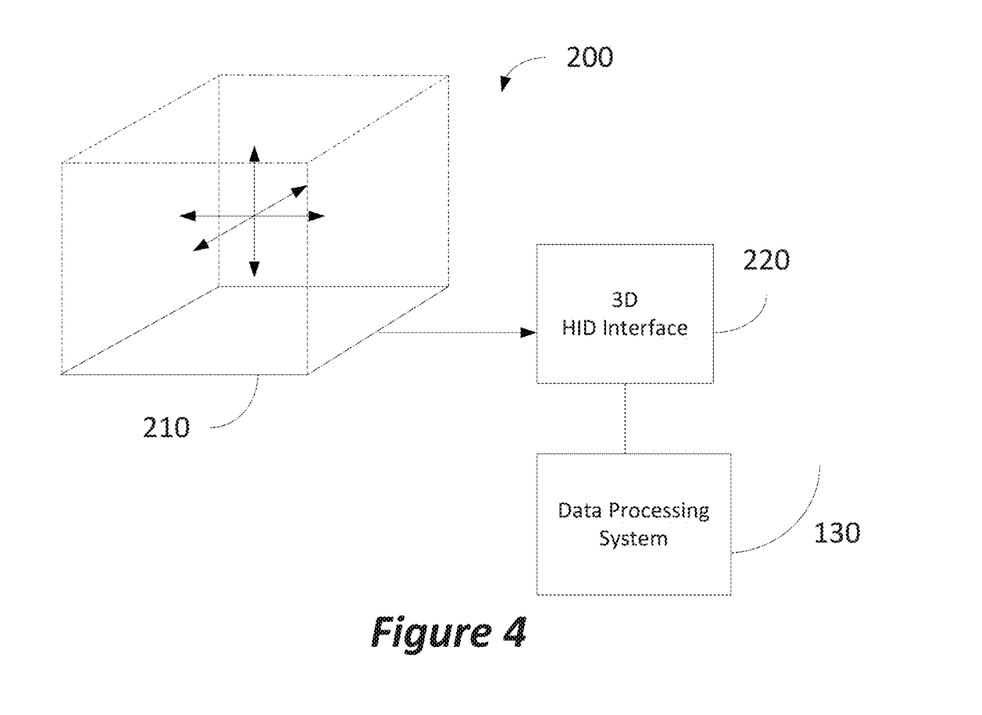
FIG. 4 shows an exemplary 3D gesture detection system.

A typical three dimensional (3D) gesture detection system 200 is shown in FIG. 4. A ground plane 210 of a detection space is shown which may also include a sensor arrangement coupled with a respective 3D detection interface 220 which is again connected to a processing system 130. Instead of the sensor arrangement used in system 200 there can be also optical detection means placed at respective suitable location in an optical 3D system. Other 3D detection systems may be used to generate the tracking points that will be fed to the various embodiments.

Figure 5:
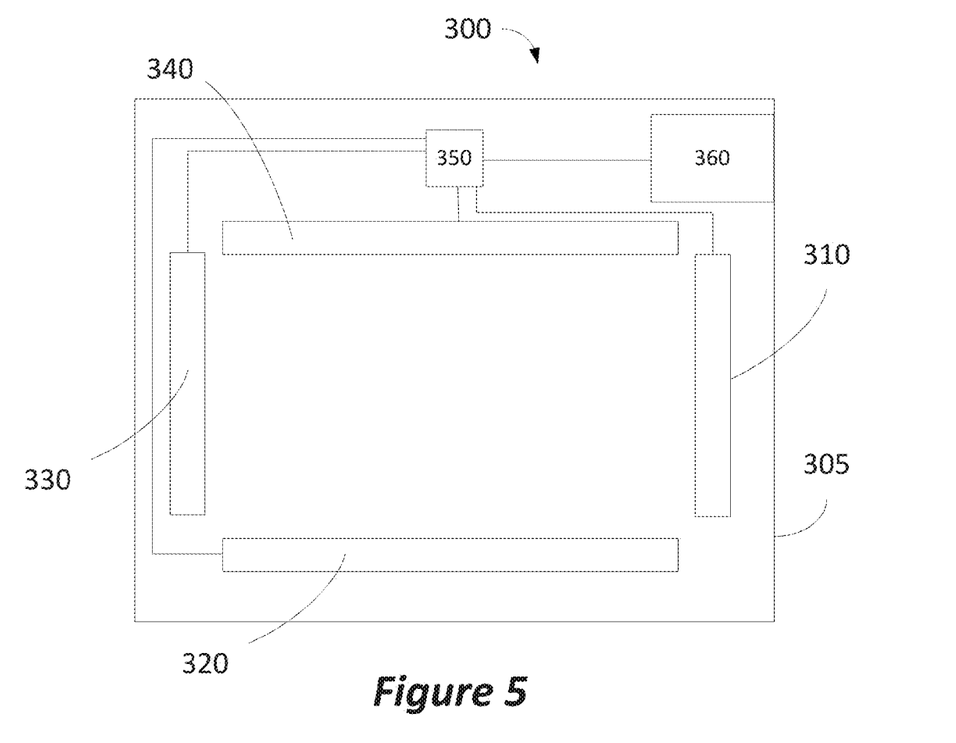
FIG. 5 shows a specific standard gesture detection electrode layout with four frame receiving electrodes using a quasi-static electric field detection method.

According to one embodiment of a touch-free gesture system, such as a three-dimensional gesture detection system that uses a quasi-static alternating electric field, a 4-frame electrode layout as depicted in FIG. 5 is provided.

Here four receiving electrodes 310, 320, 330, and 340 are arranged in the same plane and define a rectangular area. Other electrode arrangements with more or less receiving electrodes and/or other geometrical arrangements may be used according to other embodiments. Reference numeral 305 designates an underlying transmission electrode which may be supplied with, e.g., a 30-200 kHz square-wave signal. However, according to other embodiments, the transmission layer 305 may be arranged in the same plane as the receiving electrodes 310-340 and may be of different shape, or multiple Tx electrodes may be used. The transmission electrode generates a quasi-static electric field that extends upwards to define a detection space that may extend to 10-15 cm above the electrode plane. A ground shield (not shown) may be used to suppress extension of the field towards unwanted areas. The capacitive coupling between the transmission electrode and the receiving electrodes as well as the system ground will be disturbed by an electrically conductive object entering the detection space. From the disturbance measured at the receive electrodes, the direction of movement and/or the position of the object can be estimated. E.g. from measurements of at least 3 such receive electrodes, a 3-dimensional position can be estimated, whose derivative with respect to time is a velocity vector. For example an integrated circuit 350 may be used such as MGC 3130 manufactured by Applicant. A data sheet "MGC 3130 Single-Zone 3D Tracking and Gesture Controller Data Sheet", issued Ser. No. 11/192,013 is available from Applicant and hereby incorporated by reference. A receiving processing device 360 or an interface chip may be coupled with integrated circuit 350.

Other three-dimensional detection systems can be used to provide sample points and the present embodiments are not limited to the specific embodiment discussed above. However, the method discussed herein may be particularly beneficial in such a three-dimensional non-touch gesture detection system.

With a four frame electrode design 300 as discussed above, a coarse, yet functional approximation for the velocity vectors $v_k$ when the object is moving within the area spanned by 310 to 340 is given as shown below in Equation (2):

$$v_k \approx \begin{bmatrix} (m_k^{(4)} - m_{k-1}^{(4)}) - (m_k^{(2)} - m_{k-1}^{(2)}) \\ (m_k^{(3)} - m_{k-1}^{(3)}) - (m_k^{(1)} - m_{k-1}^{(1)}) \end{bmatrix} \quad (2)$$

where $m_k^{(i)}$, i=1,2,3,4 is the system measurement value of electrode i at time k, which increases with decreasing finger-to-electrode distance, where electrodes 1,2,3,4 correspond to 320, 330, 340, 310 in FIG. 5, respectively. This approximation is also functional when for one or more electrodes i the corresponding measurement value monotonously decreases with decreasing finger-to-electrode distance. Then the signs of $m_{k-1}^{(i)}$ and $m_k^{(i)}$ need to be inverted for theses electrodes i.

Figure 6:
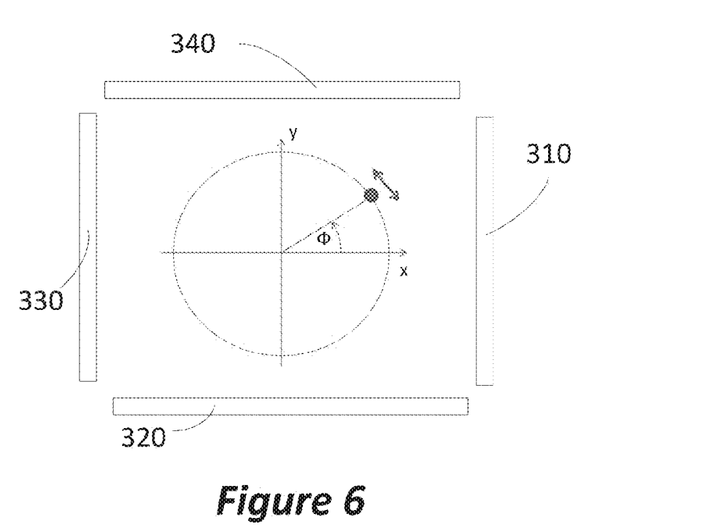
FIG. 6 shows a finger position moving clockwise or counter-clockwise on a circular path within a detection space defined by four electrodes 310-340 of the embodiment of FIG. 5.

FIG. 6 shows a shows a finger position moving clockwise or counter-clockwise on a circular path within a detection space defined by four electrodes 310-340 of the embodiment of FIG. 5. In such a system, generally the transmission electrode is used to generate the electric field, for example using a 30-200 kHz rectangular pulse train signal, e.g., generated by a microcontroller port, and a plurality of receiving electrodes from whose measurements signals a disturbance in the field can be detected when an object enters the quasi-static electric field. Gesture detection samples where the data from all electrodes has the same sign, i.e. the finger is approaching/leaving all electrodes, may be ignored for updating the circle counter. However, as mentioned above, the method may apply also to various other two- or three dimensional gesture detection systems.

Start/Stop Condition

Given a Hidden Markov Model (HMM) based automatic gesture recognition engine running in parallel with the AirWheel, one possible start condition for starting/outputting the circle counter is to share the start detection functionality of the HMM based gesture recognition system and to trigger the circle counting when a dedicated HMM becomes the most likely one. For example, HMMs for clockwise and/or counter-clockwise gesture events are suitable for being such dedicated HMMs as explained in more detail in co-pending application US-2014-0050354-A1 which is hereby incorporated in its entirety by reference.

Alternatively, the circle counting can run permanently in the background, but the outputting of counter updates is only activated, when a certain amount of counts in one rotating direction is reached within a limited amount of time, or the ratio of counts in one rotating direction and the opposite rotating direction within a given amount of time exceeds or goes below thresholds.

Depending on the memory introduced by the low-pass filters in the "Smoothness" improvement, it may be useful or necessary to clear their memory, and possibly start tracking of the circle counter some time before actually outputting it.

A stop condition can for example be that the finger leaves the active space (the space above the area spanned by the receive electrodes in a 3D gesture detection system using quasi static electric field measurements) or leaves the touch pad in a 2D-system. Another stop condition can be that the finger is resting, i.e. that the detected finger movement for example quantified by the absolute values of the velocity vectors—is below a defined threshold for a defined amount of time.

Algorithm

An exemplary pseudo code of the proposed algorithm (without simplifications/extensions) is shown below in Listing 1, where the angle $\phi$ is approximated with $\sin(\phi)$ by computing the z-element of the cross product of the normalized velocity vectors and adding it to an accumulator 'circle counter' which can be the output value.

Listing 1

```
// Initialization
status = OFF;    // AirWheel status
CC = 0;          // Circle Counter (accumulator)
v_new=[0 0]; v_old = [0 0];   // Velocity vectors
WHILE true {
   // Get new 2-dimensional velocity vectors
   v_new = fct_get_data( );
   // Normalize v_new
   v_new = fct_normalize(v_new);
   // Start/Stop Detection
   IF <Start Condition Fulfilled> {
      status = ON;
   }
   IF <Stop Condition Fulfilled> {
      status = OFF;
   }
   // Update Circle Counter (accumulator)
   IF (status == ON) {
      CC += v_new[1]*v_old[0] - v_new[1]*v_old[0];
   }
   // Backup latest velocity vector
```

Listing 1

```
    v_old = v_new;
}
```

Various Applications

The circular gesture resembles a virtual Volume control wheel of a HiFi set: Clockwise movement increases the volume, counter-clockwise movement decreases the volume.

Figure 7:
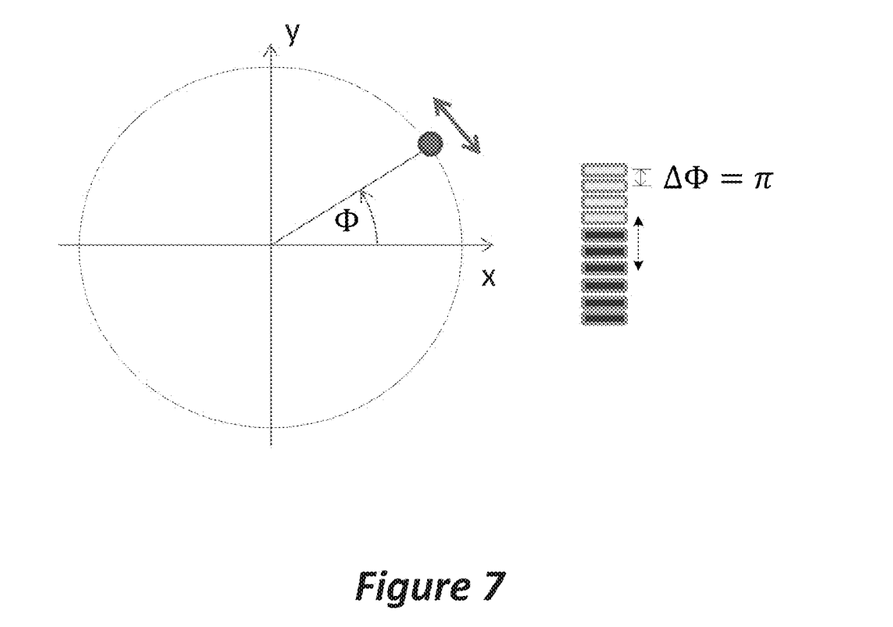
FIG. 7 shows a visualization approach for the output value of the AirWheel algorithm.

A design proposal is given in FIG. 7 which shows a visualization approach for an AirWheel volume control, volume wheel and volume level display saturating at a minimum (e.g., 0) and maximum value (e.g., 63).

It shows a volume control wheel with a phase indicator, and an LED display where the height of the bar of lightened LEDs indicates the volume. Zero lightened LEDs corresponds to mute, all LEDs lightened corresponds to maximum volume. Turning the volume wheel by circular finger movement increases/decreases the volume, and when the wheel has been turned by a defined amount, e.g. by 7E, or when the circle counter has changed by a defined amount, respectively, one LED is lightened or turned off. While the volume wheel can theoretically be turned by an infinite amount, the LED bar graph saturates at mute or maximum volume.

Such an AirWheel may be used in a wide variety of applications. For example:

Any media-player control type functionality known from circular touchpads.

Control of a dimmer in a light switch or various other appliance functions such as, for example, speed control, air condition temperature, mechanical movement functions, etc.

Replacement for a PC mouse's scroll wheel

Types of sensor systems measurement input devices (examples)
1. 2D Touch panels touch displays, 2D video cameras
2. 3D video cameras, 3D capacitive sensor systems Other Modes Provided a 2D or 3D positioning system (e.g. camera based, or capacitive sensor system), it is also possible to evaluate partial patterns (e.g. a partially drawn circle) using, for example, image processing techniques. However, this would require additional algorithmic machinery (scaling, rotation, new distance measures).

What is claimed is:

1. A method for detecting a continuous circle gesture, comprising
  receiving a sequence of vectors representative of an object movement by a object detection unit, wherein the received sequence of vectors comprises measurement values $m_k^{(i)}$ of electrodes i at times k;
  determining from the received sequence of vectors a sequence of velocity vectors or an approximation thereof;
  estimating an angle between subsequent velocity vectors; and
  determining a rotation direction, wherein the rotation direction is determined by a sign of the angle.

2. The method according to claim 1, wherein the received sequence of vectors $(x_n, y_n)$ represent position vectors of an object movement.

3. The method according to claim 2, wherein velocity vectors are computed as the difference of subsequent position vectors.

4. The method according to claim 1, wherein four measurement electrodes are provided and the velocity vectors $v_k$ are determined by $$v_k \approx \begin{bmatrix} (m_k^{(4)} - m_{k-1}^{(4)}) - (m_k^{(2)} - m_{k-1}^{(2)}) \\ (m_k^{(3)} - m_{k-1}^{(3)}) - (m_k^{(1)} - m_{k-1}^{(1)}) \end{bmatrix}.$$

5. The method according to claim 1, wherein the angle between two subsequent velocity vectors $$v_{new} = \begin{bmatrix} v_{new,x} \\ v_{new,y} \end{bmatrix} \text{ and } v_{old} = \begin{bmatrix} v_{old,x} \\ v_{old,y} \end{bmatrix}$$

is determined by $\phi = \arc \cos(\bar{v}_{new}^T \cdot \bar{v}_{old}) \cdot S$, where $S \in \{\pm 1\}$ is the rotation direction, T indicates the vector transpose, and the bar indicates normalization of a vector.

6. The method according to claim 5, wherein $S:=\text{sig n}(\bar{v}_{new,x}\bar{v}_{old,y} - \bar{v}_{new,y}\bar{v}_{old,x})$.

7. The method according to claim 1, wherein the angle $\phi$ between two subsequent velocity vectors $v_{new}$ and $v_{old}$ is approximately determined by $\phi \approx \|\bar{v}_{new} - \bar{v}_{old}\| \cdot S$, where $S \in \{\pm 1\}$ is the rotation direction.

8. The method according to claim 7, wherein $S:=\text{sig n}(\bar{v}_{new,x}\bar{v}_{old,y} - \bar{v}_{new,y}\bar{v}_{old,x})$.

9. The method according to claim 1, wherein the angle $\phi$ between two subsequent velocity vectors $v_{new}$ and $v_{old}$ is approximately determined by $\phi \approx \sin \phi = \bar{v}_{new,x}\bar{v}_{old,y} - \bar{v}_{new,y}\bar{v}_{old,x}$.

10. The method according to claim 1, wherein velocity vectors $v_{new}=v_k$ and $v_{old}=v_{k-1}$.

11. The method according to claim 1, wherein each velocity vector $v_{new}$ and $v_{old}$ in a sequence of two vectors is normalized by the same value $\|v_{new}\|$ or $\|v_{old}\|$.

12. The method according to claim 1, wherein a circle counter is realized by integrating the angles between pairs of subsequent velocity vectors, or approximations of these angles.

13. The method according to claim 12, wherein the circle counter is updated only if $\|v_k\|$ exceeds a predetermined threshold.

14. The method according to claim 12, wherein the received sequence and/or the velocity vectors and/or the circle counters are low-pass filtered.

15. The method according to claim 1, wherein the sensor system is a 3-dimensional near-field sensor system or a 3-dimensional mid/far field sensor system.

16. The method according to claim 15, wherein the near-field sensor system is a capacitive non-touching sensor system based on a quasi-static electric field measurements.

17. The method according to claim 15, wherein the near-field capacitive sensor system comprises one or more transmission electrodes excited with a rectangular pulse train signal and a plurality of receiving electrodes capacitively coupled with the one or more transmission electrodes.

18. A human device interface comprising:
  an interface generating a sequence of vectors representative of an object movement tracked by a gesture detection system, wherein the received sequence of vectors comprises measurement values $m_k^{(i)}$ of electrodes i at times k;

a processing unit configured
to determine from the received vectors a sequence of velocity vectors or an approximation thereof;
to estimate an angle between subsequent velocity vectors; and
to determine a rotation direction, wherein the rotation direction is determined by a sign of the angle;
wherein the processing unit further implements a circle counter and updates values of the circle counter by adding the estimated angle with its sign depending on the rotating direction.

19. The human device interface according to claim 18, wherein the received sequence of vectors $(x_n, y_n)$ represents position vectors of an object movement.

20. The human device interface according to claim 19, wherein velocity vectors are computed as the difference of subsequent position vectors.

21. The human device interface according to claim 18, wherein four measurement electrodes are provided and the velocity vectors $v_k$ are determined by $$v_k \approx \begin{bmatrix} (m_k^{(4)} - m_{k-1}^{(4)}) - (m_k^{(2)} - m_{k-1}^{(2)}) \\ (m_k^{(3)} - m_{k-1}^{(3)}) - (m_k^{(1)} - m_{k-1}^{(1)}) \end{bmatrix}.$$

22. The human device interface according to claim 18, wherein the angle between two subsequent velocity vectors $$v_{new} = \begin{bmatrix} v_{new,x} \\ v_{new,y} \end{bmatrix} \text{ and } v_{old} = \begin{bmatrix} v_{old,x} \\ v_{old,y} \end{bmatrix}$$

is determined by $\phi = \arccos(\bar{v}_{new}^T \cdot \bar{v}_{old}) \cdot S$, where $S \in \{\pm 1\}$ is the rotating direction, T indicates the vector transpose, and the bar indicates normalization of a vector.

23. The human device interface according to claim 22, wherein $S:=\text{sig } n(\bar{v}_{new,x}\bar{v}_{old,y} - \bar{v}_{new,y}\bar{v}_{old,x})$.

24. The human device interface according to claim 18, wherein the angle $\phi$ between two subsequent velocity vectors $v_{new}$ and $v_{old}$ is approximately determined by $\phi \approx \|\bar{v}_{new} - \bar{v}_{old}\| \cdot S$, where $S \in \{\pm 1\}$ is the rotating direction.

25. The human device interface according to claim 24, wherein $S:=\text{sig } n(\bar{v}_{new,x}\bar{v}_{old,y} - \bar{v}_{new,y}\bar{v}_{old,x})$.

26. The human device interface according to claim 18, wherein the angle $\phi$ between two subsequent velocity vectors $v_{new}$ and $v_{old}$ is approximately determined by $\phi \approx \sin \phi = \bar{v}_{new,x}\bar{v}_{old,y} - \bar{v}_{new,y}\bar{v}_{old,x}$.

27. The human device interface according to claim 18, wherein velocity v vectors $v_{new} = v_k$ and $v_{old} = v_{k-1}$.

28. The human device interface according to claim 18, wherein each velocity vector $v_{new}$ and $v_{old}$ in a sequence of two vectors is normalized by the same value $\|v_{new}\|$ or $\|v_{old}\|$.

29. The human device interface according to claim 18, wherein a circle counter is realized by integrating the angles between pairs of subsequent velocity vectors, or approximations of these angles.

30. The human device interface according to claim 29, wherein the circle counter is updated only if $\|v_k\|$ exceeds a predetermined threshold.

31. The human device interface according to claim 29, further comprising a first low-pass filter configured to filter the received sequence and/or a second low-pass filter configured to filter the velocity vectors and/or a third low-pass filter configured to filter the circle counter.

32. The human device interface according to claim 18, wherein the interface comprises a 3-dimensional near-field sensor system, or a 3-dimensional mid/far field sensor system.

33. The human device interface according to claim 32, wherein the near-field sensor system is a capacitive non-touching sensor system based on a quasi static electric field measurements.

34. The human device interface according to claim 33, wherein the near-field capacitive sensor system comprises one or more transmission electrodes excited with a rectangular pulse train signal and a plurality of receiving electrodes capacitively coupled with the one or more transmission electrodes.

35. An electronic device comprising a human device interface according to claim 18, wherein the circle counter is used for volume control, a dimmer, speed control, air condition temperature, or mechanical movement functions.

36. The electronic device according to claim 35, wherein the circle counter drives an LED bar.

37. The method according to claim 1, wherein when the angle $\phi > 0$, then the rotating direction is determined as a right rotation and when the angle $\phi < 0$, then the rotation direction is determined as a left rotation, wherein an angle of interest is within a range defined by $$\varphi = [-\frac{\pi}{2}, \frac{\pi}{2}].$$

38. The electronic device according to claim 18, wherein when the angle $\phi > 0$, then the rotating direction is determined as a right rotation and when the angle $\phi < 0$, then the rotation direction is determined as a left rotation, wherein an angle of interest is within a range defined by $$\varphi = [-\frac{\pi}{2}, \frac{\pi}{2}].$$

* * * * *